US009222848B2

(12) United States Patent
Cho

(10) Patent No.: US 9,222,848 B2
(45) Date of Patent: Dec. 29, 2015

(54) LEAKAGE DETECTION DEVICE USING SIPHON PRINCIPLE

(71) Applicant: KEPCO ENGINEERING & CONSTRUCTION COMPANY, INC., Yongin-si, Gyeonggi-Do (KR)

(72) Inventor: Dae Gwan Cho, Gyeonggi-Do (KR)

(73) Assignee: KEPCO ENGINEERING & CONSTRUCTION COMPANY, INC., Yongin-si (KR)

( * ) Notice: Subject to any disclaimer, the term of this patent is extended or adjusted under 35 U.S.C. 154(b) by 289 days.

(21) Appl. No.: 13/922,702

(22) Filed: Jun. 20, 2013

(65) Prior Publication Data

US 2014/0007673 A1    Jan. 9, 2014

(30) Foreign Application Priority Data

Jul. 4, 2012    (KR) .................. 10-2012-0072871

(51) Int. Cl.
*G01M 3/00*    (2006.01)
*G01F 23/00*    (2006.01)
*G01M 3/32*    (2006.01)

(52) U.S. Cl.
CPC .................. *G01M 3/00* (2013.01); *G01F 23/00* (2013.01); *G01M 3/3245* (2013.01)

(58) Field of Classification Search
CPC ...................................................... G01F 11/28
USPC .......................................................... 73/40
See application file for complete search history.

(56) References Cited

U.S. PATENT DOCUMENTS

| | | | |
|---|---|---|---|
| 2,895,447 A | * | 7/1959 | Burrell ........................... 116/228 |
| 3,710,613 A | * | 1/1973 | Innes et al. .................... 335/205 |
| 4,852,054 A | | 7/1989 | Mastandrea |
| 5,273,067 A | * | 12/1993 | Andersson et al. ........... 137/129 |
| 5,743,135 A | * | 4/1998 | Sayka et al. ..................... 73/293 |

FOREIGN PATENT DOCUMENTS

| | | |
|---|---|---|
| DE | 2025720 A1 | 2/1971 |
| EP | 580 524 A1 | 1/1994 |
| JP | 02-259457 A | 10/1990 |
| JP | 2011-236876 A | 11/2011 |
| JP | 2012-052409 A | 3/2012 |
| KR | 10-1994-0026686 A | 12/1994 |

OTHER PUBLICATIONS

Korean Patent Office issuance of Notice of Allowance, dated Dec. 18, 2013 corresponding to Korean Patent Application No. 10-2012-0072871; English language translation; (8 pages total).
European Search Report; Application No. EP13174947.5, dated Dec. 3, 2014, Applicant: Kepco Engineering & Construction Company, Inc. (8 pages).

* cited by examiner

*Primary Examiner* — Hezron E Williams
*Assistant Examiner* — Mark A Shabman
(74) *Attorney, Agent, or Firm* — Schwabe, Williamson & Wyatt, P.C.

(57) ABSTRACT

Provided is a leakage detection device using siphon principle. The leakage detection device includes a water level measuring tube that has a closed lower end portion and includes a first inflow port through which leakage water flows, a water collection tank that accommodates the water level measuring tube, a discharging pipe that includes a first inducing pipe vertically disposed in the water level measuring tube, a connecting pipe extended from an upper end portion of the first inducing pipe through a sidewall of the water level measuring tube, and a second inducing pipe extended from one end portion of the connecting pipe to a lower side of the water collection tank, a lower end portion of the second inducing pipe being disposed lower in position than a lower end portion of the first inducing pipe, and a water level measurer that detects a level of the leakage water flowed into the water level measuring tube.

6 Claims, 1 Drawing Sheet

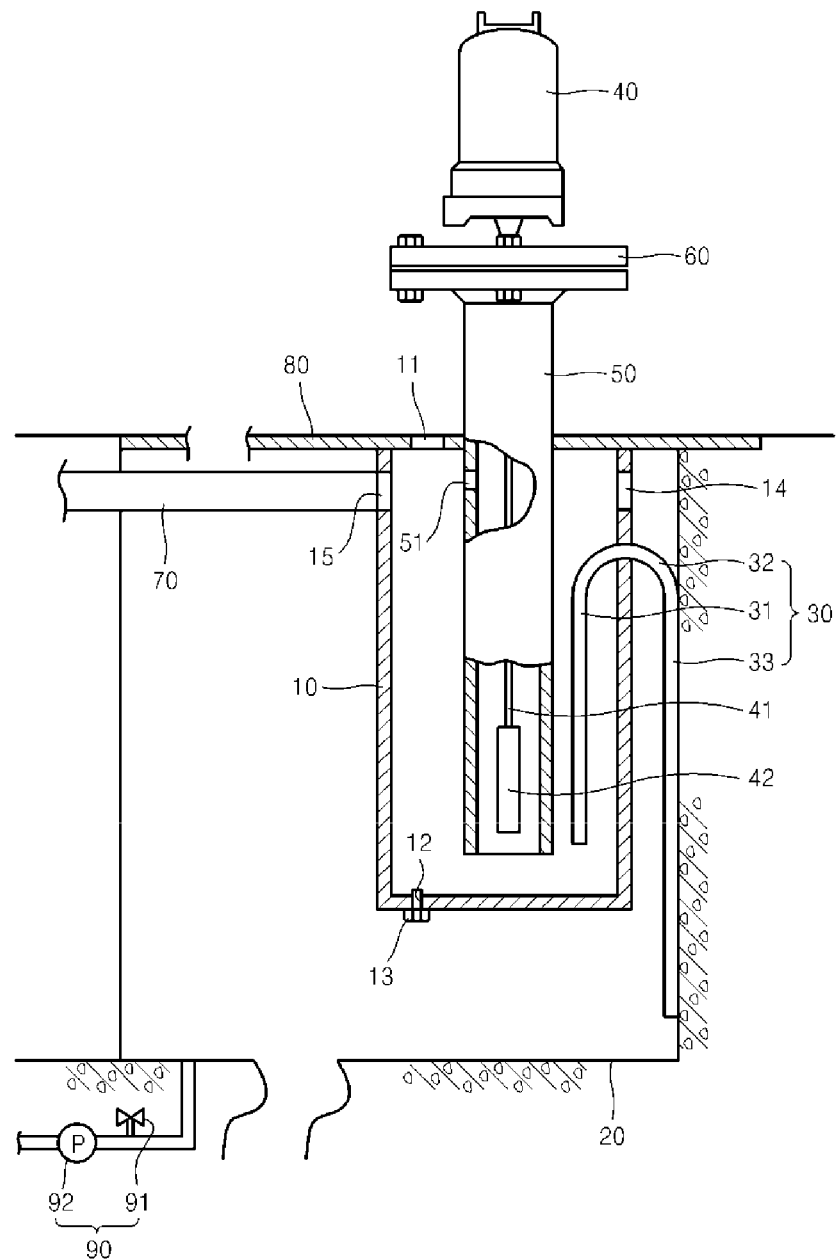

LEAKAGE DETECTION DEVICE USING SIPHON PRINCIPLE

CROSS-REFERENCE TO RELATED PATENT APPLICATION

This application claims the benefit of Korean Patent Application No. 10-2012-0072871, filed on Jul. 4, 2012, in the Korean Intellectual Property Office, the disclosure of which is incorporated herein in its entirety by reference.

BACKGROUND OF THE INVENTION

1. Field of the Invention

The present invention relates to a leakage detection device using the siphon principle, and more particularly, to a leakage detection device for precisely measuring a leakage rate even when leakage water collected in a water collection tank is small in amount.

2. Description of the Related Art

A conventional leakage detection device measures a level of water collected in a water collection tank, detects the water level changed with time, and calculates a leakage rate. Generally, when leakage water flows into the water collection tank, a change in a level of the leakage water is detected using a floating type, a displacement type, or an ultrasonic type. The floating type, the displacement type, or the ultrasonic type is generally-known technology, and thus, its detailed description is not provided. To provide a brief description, the floating type or the displacement type is a type in which a water level change is calculated when a member floated on water by a buoyancy of leakage water rises as a water level rises, and the ultrasonic type is a type in which a measuring instrument is disposed on a surface of leakage water, the measuring instrument irradiates an ultrasonic wave on the surface of the leakage water, a distance from the leakage water to the measuring instrument is calculated with the ultrasonic wave reflected from the surface of the leakage water, and a change in a level of the leakage water is calculated with the distance.

However, the conventional leakage detection device generally measures a change in leakage water collected in a water collection tank having a broad cross-sectional area, and for this reason, when the leakage water is small, it is unable to precisely measure a leakage rate because a water-level change is not great.

SUMMARY OF THE INVENTION

The present invention provides a leakage detection device using the siphon principle which can precisely measure a change in a level of leakage water even when the leakage water flowing into a water collection tank is small.

According to an aspect of the present invention, there is provided a leakage detection device using a siphon principle, including: a water level measuring tube that has a closed lower end portion, and includes a first inflow port through which leakage water flows; a water collection tank that accommodates the water level measuring tube; a discharging pipe that includes a first inducing pipe vertically disposed in the water level measuring tube, a connecting pipe extended from an upper end portion of the first inducing pipe through a sidewall of the water level measuring tube, and a second inducing pipe extended from one end portion of the connecting pipe to a lower side of the water collection tank, a lower end portion of the second inducing pipe being disposed lower in position than a lower end portion of the first inducing pipe; and a water level measurer that detects a level of the leakage water flowed into the water level measuring tube.

The leakage detection device may further include an inserting pipe that vertically extends and is disposed in the water level measuring pipe, wherein the water level measurer measures a level of the leakage water flowed into the inserting pipe.

The leakage detection device may further include an exhaust hole formed at a sidewall of the inserting pipe, wherein when the leakage water flows into the inserting pipe, internal air of the inserting pipe is discharged through the exhaust hole.

The leakage detection device may further include a flange provided at an upper end portion of the inserting pipe, wherein the water level measurer is mounted on the flange.

The leakage detection device may further include a leakage water overflow preventing hole formed at the water level measuring tube, at a position higher than position of the connecting pipe.

The leakage detection device may further include a draining port that is formed at a bottom of the water level measuring tube and selectively opens or closes the bottom of the water level measuring tube to drain the leakage water flowed into the water level measuring pipe.

The leakage detection device may further include a second inflow port that is formed at the water level measuring tube and into which leakage water from adjacent facility flows.

In the leakage detection device, an upper side of the water collection tank may be closed by a tank cover, the first inflow port may be formed at the same height as the tank cover, and the second inflow port may be formed at a lower side in position than the first inflow port.

BRIEF DESCRIPTION OF THE DRAWINGS

The above and other features and advantages of the present invention will become more apparent by describing in detail exemplary embodiments thereof with reference to the attached drawings in which:

FIG. 1 is a cross-sectional view illustrating a leakage detection device using the siphon principle according to an embodiment of the present invention.

DETAILED DESCRIPTION OF THE INVENTION

Hereinafter, embodiments of the present invention will be described in detail with reference to the accompanying drawings.

FIG. 1 is a cross-sectional view illustrating a leakage detection device using the siphon principle according to an embodiment of the present invention.

Referring to FIG. 1, the leakage detection device using the siphon principle according to an embodiment of the present invention includes a water level measuring tube 10, a water collection tank 20, a discharging pipe 30, and a water level measurer 40.

The water level measuring tube 10 is disposed inside the water collection tank 20, and includes a first inflow port 11 through leakage water flows into the water level measuring tube 10. In the embodiment, the first inflow port 11 is formed at an upper end portion of the water level measuring tube 10, and a lower end portion of the water level measuring tube 10 is closed.

According to the embodiment, the water level measuring tube 10 includes a draining port 12, a leakage water overflow preventing hole 14, and a second inflow port 15.

The draining port 12 is formed at a bottom of the water level measuring tube 10, and prepared for selectively opening/closing the bottom of the water level measuring tube 10. The draining port 12 is selectively opened/closed by a stopper 13. Leakage water stored in the water level measuring tube 10 is discharged through the draining port 12, and then maintenance work of the inside of the water level measuring tube 10 can be performed.

The leakage water overflow preventing hole 14 is prepared for preventing the leakage water from overflowing from the water level measuring tube 10. The leakage water overflow preventing hole 14 is formed at a sidewall of the water level measuring tube 10, at a position higher than that of a connecting pipe 32 described below.

The second inflow port 15 is prepared for enabling an inflow of leakage water leaked from adjacent facilities such as an adjacent factory, power plant, etc. The leakage water from the adjacent facilities, such as the adjacent factory, power plant, etc., is collected in a separate water collection tank (hereinafter referred to as "adjacent water collection tank") and then flows into the water level measuring tube 10 via the second inflow port 15 through a water collecting pipe 70, or directly flows into the water level measuring tube 10 via the water collecting pipe 70 from the adjacent facilities such as the adjacent factory, power plant, etc. That is, the second inflow port 15 is prepared for enabling an inflow of leakage water from an adjacent facility.

The water collection tank 20 accommodates the water level measuring tube 10. A cross-sectional area of a lower end portion of the water collection tank 20 is broader than that of the water level measuring tube 10.

The discharging pipe 30 is provided for discharging leakage water from the water level measuring tube 10 to the water collection tank 20 when a level of the leakage water flowed into the water level measuring tube 10 reaches a certain level.

The discharging pipe 30 includes a first inducing pipe 31, the connecting pipe 32, and a second inducing pipe 33.

The first inducing pipe 31 is vertically disposed in the water level measuring tube 10. A lower end portion of the first inducing pipe 31 is disposed slightly apart from the bottom of the water level measuring tube 10.

The connecting pipe 32 is extended from an upper end portion of the first inducing pipe 31 through the sidewall of the water level measuring tube 10. The connecting pipe 32 connects the first inducing pipe 31 to the second inducing pipe 33 described below.

The second inducing pipe 33 is extended from one end portion of the connecting pipe 32 to a lower side of the water collection tank 20. A lower end portion of the second inducing pipe 33 is disposed lower in position than a lower end portion of the first inducing pipe 31 to be slightly separated from the bottom of the water collection tank 20.

In the embodiment, the discharging pipe 30 has a reversed U-shape (∩-shape). The shape of the discharging pipe 30 is not limited thereto.

The water level measurer 40 is provided for detecting a level of the leakage water flowed into the water level measuring tube 10. The water level measurer 40 detects the level of leakage water flowed into the water level measuring tube 10 at certain time intervals to calculate a leakage rate. The water level measurer 40 has a generally known configuration, and thus, it is detailed description is not provided.

The leakage detection device using the siphon principle according to an embodiment of the present invention includes an inserting pipe 50, a flange 60, a tank cover 80, and a draining equipment 90.

The inserting pipe 50 is vertically extended and disposed in the water level measuring tube 10. A cross-sectional area of the inserting pipe 50 is formed less than that of the water level measuring tube 10, and the leakage water flowed into the water level measuring tube 10 flows into the inserting pipe 50.

When the leakage water flows into the water level measuring tube 10, the inserting pipe 50 prevents a water level from being disturbed due to an inflow of the leakage water, thus enabling the water level to be stably measured.

An exhaust hole 51 is formed at the inserting pipe 50. The exhaust hole 51 is prepared at a sidewall of the inserting pipe 50, and when the leakage water flows into the inserting pipe 50, the exhaust hole 51 discharges the internal air of the inserting pipe 50.

When the leakage water flows into the inserting pipe 50 and thus a water level rises, the upper air of the inserting pipe 50 is discharged as the level of leakage water rises, and thus, the water level can be stably measured.

The flange 60 is prepared at an upper end portion of the inserting pipe 50, and the water level measurer 40 is mounted on the flange 60. In the embodiment, the water level measurer 40 detects a level of the leakage water flowed into the inserting pipe 50.

Specifically, the water level measurer 40 applied to the embodiment includes a rope 41 and a rising member 42. The rope 41 is downward connected to the water level measurer 40 mounted on the flange 60, and the rising member 42, which rises as a level of leakage water rises, is coupled to one end portion of the rope 41.

The rising member 42 rises simultaneously with rising of the level of leakage water, and the water level measurer 40 measures a water level change at certain time intervals to calculate a leakage rate. The embodiment uses a so-called displacement type water level measurer 40. The displacement type water level measurer 40 is generally known, and thus, its detailed description is not provided.

Moreover, the water level measurer 40 may use a floating type or an ultrasonic type. The floating type and the ultrasonic type are known technology, and thus, its detailed description is not provided. To provide a brief description, the floating type is a type in which when a level of leakage water rises and falls, a water level measuring member is raised and lowered simultaneously with rising and falling of a surface of the leakage water to detect a water level, and the ultrasonic type is a type in which an ultrasonic wave is irradiated from an upper side above the surface of the leakage water onto the surface of the leakage water, a distance from the leakage water to the water level measurer 40 is calculated with a reflected ultrasonic wave reflected from the surface of the leakage water, and the water level is calculated with the distance.

The tank cover 80 is prepared for closing an upper side of the water collection tank 20. In the embodiment, a space for storing leakage water is formed by the water collection tank 20 and the tank cover 80, and the leakage water flows into the water level measuring tube 10 through the first inflow port 11 or the second inflow port 15.

In the embodiment, the first inflow port 11 is formed at the same height as the tank cover 80, and the second inflow port 15 is formed at a lower side in position than the first inflow port 11.

Leakage water of equipment, which the water collection tank 20 intends to collect, is transferred to the water collection tank 20, and flows into the water level measuring tube 10 through the first inflow port 11. Meanwhile, Leakage water from adjacent facilities, such as an adjacent power plant, factory, etc., flows into the water level measuring tube 10 via the second inflow port 15 through a water collecting pipe 70.

The draining equipment 90 is prepared for discharging leakage water to the outside when the leakage water is filled by a certain amount or more in the water collection tank 20. The draining equipment 90 includes an opening/closing valve 91 and a pump 92. The draining equipment 90 has a generally known configuration, and thus, its detailed description is not provided.

Hereinafter, an operation and effect of the leakage detection device using the siphon principle according to an embodiment of the present invention having the above-described configuration will be described in detail.

Leakage water from facilities, such as a factory, a power plant, etc., is transferred to the water collection tank 20, and flows into the water level measuring tube 10 through the first inflow port 11. Meanwhile, Leakage water from adjacent facilities, such as an adjacent power plant, factory, etc., flows into the water level measuring tube 10 via the water collecting pipe 70 and the second inflow port 15.

As leakage water flows into the water level measuring tube 10, the leakage water flows into the inserting pipe 50, and a level of the leakage water rises. At this time, the water level measurer 40 measures the level of leakage water at certain time intervals to calculate a leakage rate.

When a level of leakage water reaches a height at which the connecting pipe 32 is disposed, the leakage water filled in the water level measuring tube 10 is automatically discharged to the water collection tank 20 via the first inducing pipe 31, the connecting pipe 32, and the second inducing pipe 33 by the siphon principle. When the leakage water in the water level measuring tube 10 is emptied by the siphon principle, the water level measurer 40 again calculates a leakage rate based on an inflow of the leakage water at certain time intervals.

As described above, the leakage detection device using the siphon principle according to an embodiment of the present invention can sensitively, accurately calculate a leakage rate even when an inflow of leakage water is small in amount, by using the water level measuring tube 10 having a cross-sectional area less than that of the water collection tank 20.

Moreover, the inserting pipe 50 is disposed in the water level measuring tube 10, and prevents a water level from being disturbed due to an inflow of leakage water, thus enabling a change in a level of the leakage water to be more sensitively measured.

Moreover, the leakage detection device is low in installation cost, and sensitively detects a leakage rate in factories, facilities, power plants, etc., thus enabling the factories to be operated more safely than a case using the conventional leakage detection device.

Moreover, the leakage detection device can use the existing water collection tank facilities, and thus can reduce an economic burden on replacement of equipment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A leakage detection device using a siphon principle, the leakage detection device comprising:
  a water level measuring tube that has a closed lower end portion, and comprises a first inflow port through which leakage water flows;
  a water collection tank that accommodates the water level measuring tube;
  a discharging pipe that comprises a first inducing pipe vertically disposed in the water level measuring tube, a connecting pipe extended from an upper end portion of the first inducing pipe through a sidewall of the water level measuring tube, and a second inducing pipe extended from one end portion of the connecting pipe to a lower side of the water collection tank, a lower end portion of the second inducing pipe being disposed lower in position than a lower end portion of the first inducing pipe;
  a water level measurer that detects a level of the leakage water flowed into the water level measuring tube; and
  a second inflow port that is formed at the water level measuring tube and into which leakage water from an adjacent facility flows;
  wherein—
  an upper side of the water collection tank is closed by a tank cover,
  the first inflow port is formed at the same height as the tank cover, and
  the second inflow port is formed at a lower side in position than the first inflow port.

2. The leakage detection device of claim 1, further comprising an inserting pipe that vertically extends and is disposed in the water level measuring tube, wherein the water level measurer measures a level of the leakage water flowed into the inserting pipe.

3. The leakage detection device of claim 2, further comprising an exhaust hole formed at a sidewall of the inserting pipe,
  wherein when the leakage water flows into the inserting pipe, internal air of the inserting pipe is discharged through the exhaust hole.

4. The leakage detection device of claim 2, further comprising a flange provided at an upper end portion of the inserting pipe, wherein the water level measurer is mounted on the flange.

5. The leakage detection device of claim 1, further comprising a leakage water overflow preventing hole formed at the water level measuring tube, at a position higher than position of the connecting pipe.

6. The leakage detection device of claim 1, further comprising a draining port that is formed at a bottom of the water level measuring tube and selectively opens or closes the bottom of the water level measuring tube to drain the leakage water flowed into the water level measuring tube.

* * * * *